US011449471B2

(12) United States Patent
Meschkat (10) Patent No.: US 11,449,471 B2
(45) Date of Patent: Sep. 20, 2022

(54) SHARING A MODIFIED FILE

(71) Applicant: GOOGLE LLC, Mountain View, CA (US)

(72) Inventor: Steffen Meschkat, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 216 days.

(21) Appl. No.: 16/261,087

(22) Filed: Jan. 29, 2019

(65) Prior Publication Data

US 2020/0201823 A1 Jun. 25, 2020

Related U.S. Application Data

(60) Provisional application No. 62/784,439, filed on Dec. 22, 2018.

(51) Int. Cl.
*G06F 16/178* (2019.01)
*H04L 67/06* (2022.01)
*H04L 67/1095* (2022.01)
*G06F 16/176* (2019.01)

(52) U.S. Cl.
CPC .......... *G06F 16/178* (2019.01); *G06F 16/176* (2019.01); *H04L 67/06* (2013.01); *H04L 67/1095* (2013.01)

(58) Field of Classification Search
CPC ..... G06F 16/178; G06F 16/176; H04L 67/06; H04L 67/1095
See application file for complete search history.

(56) References Cited

U.S. PATENT DOCUMENTS

| 7,734,690 | B2 | 6/2010 | Moromisato et al. |
| 8,825,597 | B1 | 9/2014 | Houston et al. |
| 2007/0136662 | A1* | 6/2007 | Khaba ............ G06F 40/131 715/202 |
| 2007/0162516 | A1 | 7/2007 | Thiel et al. |
| 2008/0301247 | A1 | 12/2008 | Halim et al. |
| 2010/0198871 | A1* | 8/2010 | Stiegler ........... H04L 67/06 707/783 |

(Continued)

OTHER PUBLICATIONS

"Collaborate on Word documents with real-time co-authoring", Microsoft Office—Office Support (https://support.office.com/en-us/article/collaborate-on-word-documents-with-real-time-co-authoring-7dd3040c-3f30-4fdd-bab0-8586492a1f1d), Jun. 14, 2018, 9 pages.

(Continued)

*Primary Examiner* — Apu M Mofiz
*Assistant Examiner* — Farhad Agharahimi
(74) *Attorney, Agent, or Firm* — Brake Hughes Bellermann LLP (57) ABSTRACT

A method can include, in response to receiving sharing input from a local user into a local computing device, sending a file from the local computing device to a recipient, in response to sending the file, storing a sharing record on the local computing device, the sharing record identifying the file and the recipient, in response to receiving modification input from the local user into the local computing device to modify the file, determining that the sharing record identifies the file and the recipient, and based on determining that the sharing record identifies the file and the recipient, initiating sending at least a portion of the file to the recipient.

20 Claims, 8 Drawing Sheets

(56) References Cited

U.S. PATENT DOCUMENTS

| | | | |
|---|---|---|---|
| 2012/0278281 A1 | 11/2012 | Meisels et al. | |
| 2013/0205219 A1* | 8/2013 | Moha | G06F 3/04842 |
| | | | 715/748 |
| 2013/0318035 A1* | 11/2013 | Swanson | G06F 16/182 |
| | | | 707/608 |
| 2016/0373518 A1* | 12/2016 | Dwan | G06F 16/951 |
| 2018/0314713 A1* | 11/2018 | Penangwala | G06F 16/137 |
| 2019/0155789 A1* | 5/2019 | Dorman | G06F 16/178 |
| 2019/0278451 A1* | 9/2019 | Agrawal | H04L 67/06 |

OTHER PUBLICATIONS

International Search Report and Written Opinion for Application No. PCT/US2019/046634, dated Oct. 15, 2019, 15 pages.

* cited by examiner

SHARING A MODIFIED FILE

PRIORITY CLAIM

This Application claims priority to U.S. Provisional Application No. 62/784,439, filed on Dec. 22, 2018, entitled, "SHARING MODIFIED FILE," the disclosure of which is hereby incorporated by reference.

BACKGROUND

Shared files can be modified by users in remote locations. Storing a shared file at a location remote to all users of the file can consume communication resources when the file is not being used. Files stored in remote locations can also be inaccessible to users without network access, and may not be under control of the owner of the file or device.

SUMMARY

According to an example, a method can include, in response to receiving sharing input from a local user into a local computing device, sending a file from the local computing device to a recipient, in response to sending the file, storing a sharing record on the local computing device, the sharing record identifying the file and the recipient, in response to receiving modification input from the local user into the local computing device to modify the file, determining that the sharing record identifies the file and the recipient, and based on determining that the sharing record identifies the file and the recipient, initiating sending at least a portion of the file to the recipient According to an example, a non-transitory computer-readable storage medium comprising instructions stored thereon. When executed by at least one processor, the instructions can be configured to cause a local computing device to, in response to receiving sharing input from a local user into the local computing device, send a file from the local computing device to a recipient, in response to sending the file, store a sharing record on the local computing device, the sharing record identifying the file and the recipient, in response to receiving modification input from the local user into the local computing device to modify the file, determine that the sharing record identifies the file and the recipient, and based on determining that the sharing record identifies the file and the remote user, initiate sending at least a portion of the file to the recipient.

An apparatus can include at least one processor and at least one memory device. The at least one memory device can comprise instructions stored thereon that, when accessed by the at least one processor, cause the apparatus to, in response to receiving sharing input from a local user into a local computing device, send a file from the local computing device to a recipient, in response to sending the file, store a sharing record on the local computing device, the sharing record identifying the file and the recipient, in response to receiving modification input from the local user into the local computing device to modify the file, determine that the sharing record identifies the file and the recipient, and based on determining that the sharing record identifies the file and the remote user, initiate sending at least a portion of the file to the recipient.

The details of one or more implementations are set forth in the accompanying drawings and the description below. Other features will be apparent from the description and drawings, and from the claims.

DETAILED DESCRIPTION

Files can be shared and modified by users of multiple computing devices directly accessed by users, such as a local computing device and a remote computing device. A technical problem of storing shared files on a third-party device, such as a third-party server, is that the storage on the third-party device necessitates communication between the third-party device and the multiple computing devices directly accessed by the users who share and modify the files, which consumes communication and/or networking resources. Another technical problem is that users without network access cannot access files stored on a third-party device. Another technical problem is the consumption of memory resources on the third-party device. To avoid communication between the computing devices when the files are not being modified, and thereby reduce the consumption of communication and/or networking resources, a technical solution is to store files only locally on the computing devices directly accessed by users, and initiating sharing and/or sending a file after the user has modified the file. This technical solution has the technical benefits of reducing memory use by obviating any need to store the shared files on another device, such as a third-party server, and avoiding the need for communication when the files are not being modified. In some examples, the file(s) are not shared on any computing device other than the computing devices associated with and/or accessing the users who are sharing the file(s). In some examples, the file(s) are stored on no more computing devices than the number of users who are sharing the file(s).

Figure 1:
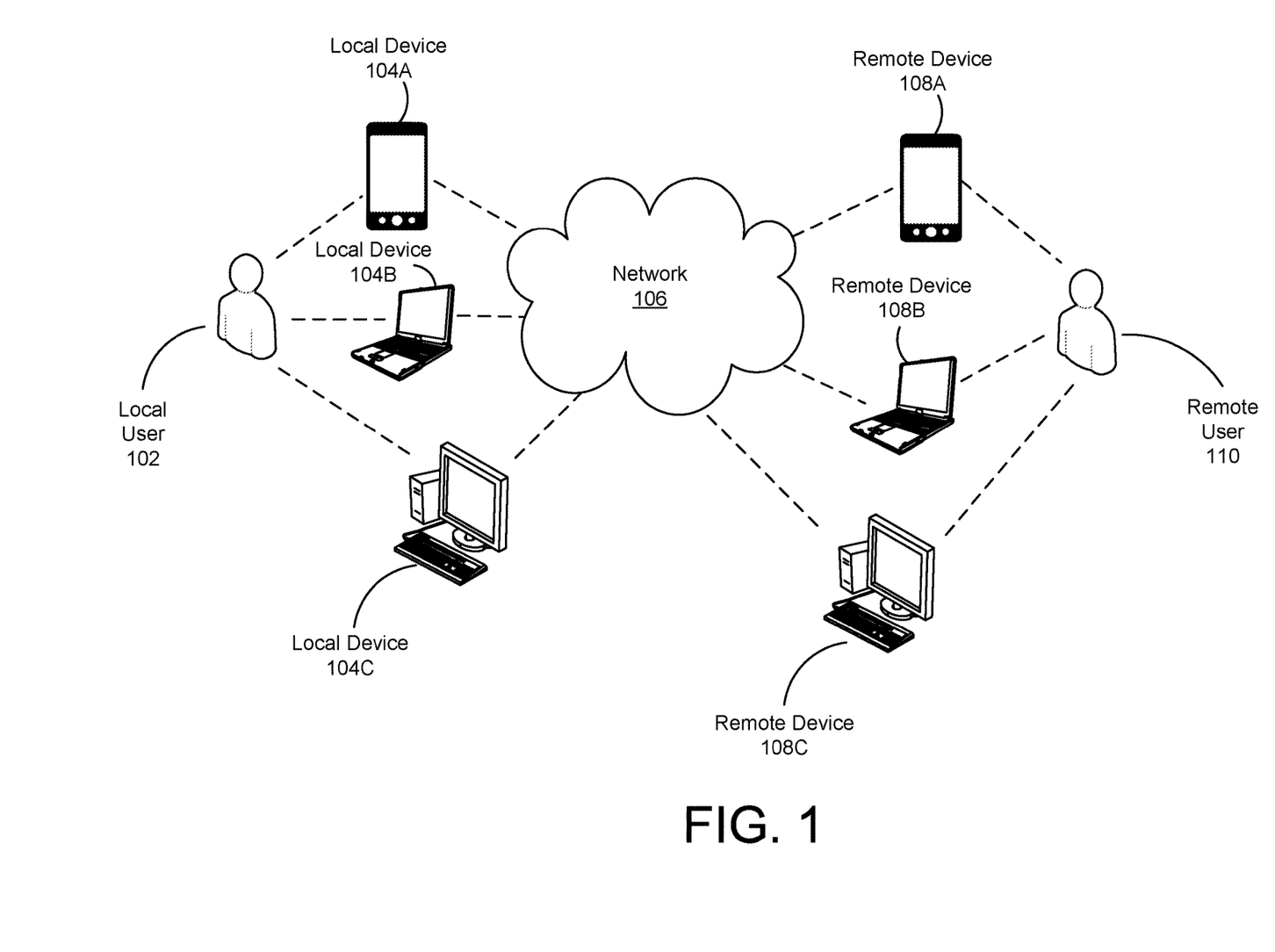
FIG. 1 is a network diagram showing entities that can modify and/or share a file according to an example.

FIG. 1 is a network diagram showing entities that can modify and/or share a file according to an example. A local user 102 can create, access, modify, and/or save a file. A file can include a word processing document, a spreadsheet or comma separated value file, source code for a software program, or a drawing file, as non-limiting examples. The local user 102 can create, access, modify, and/or save the file on a local computing device 104A, 104B, 104C, such as a smartphone local computing device 104A, a tablet or notebook local computing device 104B, or a desktop local computing device 104C (local computing device 104 shall hereinafter refer to a single local computing device), as non-limiting examples. The local user 102 can create, access, modify, and/or save the file on a single local computing device 104, and the file can be saved and/or stored on the single local computing device 104. The version and/or instance of the file saved and/or stored on the single local computing device can be inaccessible to other computing devices.

The local user 102 can choose to share the file with another user who does not have access to the local computing device 104 on which the file is saved and/or stored. The recipient with whom the local user chooses to share the file can be a user such as a remote user, a user profile, and/or a remote user device, and shall be referred to herein as a remote user 110. The remote user 110 can access, modify, and/or save the version and/or instance of the file saved and/or stored on a remote computing device 108A, 108B, 108C, such as a smartphone remote computing device 108A, a tablet or notebook remote computing device 108B, or a desktop remote computing device 108C (remote computing device 108 shall hereinafter refer to a single local computing device), as non-limiting examples, via the remote computing device 108.

The local user 102 can choose to share the file with the remote user 110. The local user 102 and remote user 110 can be collaborating on a document represented by the file, or the local user 102 may simply want to provide the remote user 110 with a most recent copy of the file. Methods, functions, and/or techniques described herein with respect to the local user 102 sharing the file with the remote user 110 can also be performed in the opposite direction, enabling the remote user 110 to share the file and/or another file with the local user 102.

The local user 102 can provide sharing input into the local computing device 104, and the local computing device 104 can receive sharing input from the local user 102. The local user 102 can provide the sharing input into the local computing device 104 by pressing and/or clicking a sharing button built into an application or operating system running on the local computing device 104, or by instructing the local computing device 104 to send the file to the remote user 110, such as by clicking a send button within an email program with the file attached to an email with the remote user's email address included as a recipient of the email. The sharing input can identify the file and/or the remote user. The sharing input can identify the remote user by, for example, a user identifier or email address associated with the remote user 110, or an address of the remote computing device 108 associated with the remote user 110. The local computing device 104 can respond to receiving the sharing input from the local user 102 by sending the file to the remote user 110.

The local computing device 104 can respond to receiving the sharing input by sending the file to the remote computing device 108 associated with the remote user 110. The local computing device 104 can send the file to the remote computing device 108 via a network 106, such as a local area network (LAN), a cellular network, or the Internet, or directly to the remote computing device 108 when the local computing device 104 and remote computing device 108 are capable of peer-to-peer communication with each other. The remote computing device 108 can become associated with the remote user 110 by the remote user 110 logging into the remote computing device 108 with an email address or user identifier included in the sharing input received by the local computing device 104. The remote user 110 can access the file on the remote computing device 110.

In response to the local user 102 sharing the file with the remote user 110 and/or the remote computing device 104 sending the file to the remote computing device 108, the local computing device 104 can store a sharing record on the local computing device 104. The sharing record can indicate that the file was previously shared by the local user 102 with the remote user 110. The sharing record can identify the file and the remote user 110 and/or remote computing device 108 with whom the file was shared.

After having shared the file with the remote user 110, the local user 102 can subsequently modify the file. The local user 102 can subsequently modify the file within a same session on the application, or can close the file and later open the file on the same or a different application. The local user 102 can modify the file by adding material, such as text, removing material, or replacing material in the file. The local user 102 can modify the file by providing modification input into the local computing device 104, such as keystrokes or touch input that add, remove, or replace one or more portions of the file, such as text or other data included in the file. The modified file can be shared and/or sent after modification within a same or different application as the application from which the file was previously shared and/or sent.

In response to receiving the modification input from the local user 102, the local computing device 104 can determine whether a sharing record stored on the local computing device 104, such as the sharing record that the local computing device 104 created and/or stored in response to the local user 102 sharing the file with the remote user 110, identifies the file and/or the remote user 110. The local computing device 104 can perform the determination of whether a sharing record identifies the file and/or remote user 110 upon receiving the modification input, or after a subsequent event, such as the local user 102 instructing the local computing device 104 to save the modified file or closing the application in which the file was modified. The local computing device 104 can determine whether a sharing record identifies the file and/or remote user 110 by searching sharing records and determining whether one or more sharing records identifies the modified file. If the local computing device 104 determines that one or more sharing records identifies the modified file, then the local computing device 104 can determine which user(s), such as the remote user 110, is identified by a sharing record that identifies the modified file.

Based on determining that the sharing record identifies the modified file and the remote user 110, the local computing device 104 can initiate sending at least a portion of the modified file to the remote user 110. In some examples, the initiating sending can include sending at least the portion of the file to the remote user. In some examples, the initiating sending can include prompting the local user 102 to send the portion of the file to the remote user 110. The initiating sending can include sharing and/or sending, and/or prompting the local user 102 to share and/or send, at least a portion of the modified file to the remote user 110. The local computing device 104 can share and/or send the entire modified file and/or all of the file, only a modified portion of the file (such as a portion of the file that was added), or an indication of the modification(s) to the file, according to example implementations. The local computing device 104 can share and/or send the modified file by sending an electronic message, such as an email including the file, to the remote computing device 108. In some examples, the local computing device 104 can send and/or share the file to and/or with a different address than an address to which the file was initially sent and/or shared. In some examples, the local user 102 and/or local computing device 104 can share the file with, and/or send the file to, a first address associated with the remote user 110, and, after modifying the file, the local user 102 and/or local computing device 104 can share the file with, and/or send the file to, a second address associated with the remote user 110. While this example describes the local user 102 subsequently modifying the shared file on the local computing device 104, and the local computing device 104 determining whether a sharing record identifies the file and/or remote user 110 and initiating sending at least the portion of the file, in some examples, the remote user 110 can subsequently modify the shared file on the remote computing device 108, and the remote computing device can determine whether a sharing record identifies the file and/or local user 102 (and/or another user with whom the file is shared) and initiate sending at least a portion of the shared file to the local user 102 (and/or another user).

In some examples, the sharing record can identify and/or refer to a contact record associated with the remote user. The contact record can include contact information such as an address, such as an email address, a telephone number, or a user identifier associated with a social networking website. The local computing device 104 can extract the address from the contact record. The local computing device 104 can send and/or share, or prompt the local user 102 to send and/or share, at least the portion of the file to the extracted address. The local computing device 104 can prompt the local user 102 to share the file and/or modified file by presenting the local user 102 with a button and/or popup window. The local computing device 104 can send and/or share the file in response to the local user 102 providing input into the button and/or popup window, according to an example implementation. The local computing device 104 can send and/or share the file by, for example, sending an email to the remote user 110 with the file as an attachment, sending a text message that includes the file to the remote user 110, or uploading the file to a social networking website and authorizing the remote user 110 to access the file at the social networking website, as non-limiting examples.

Figure 2:
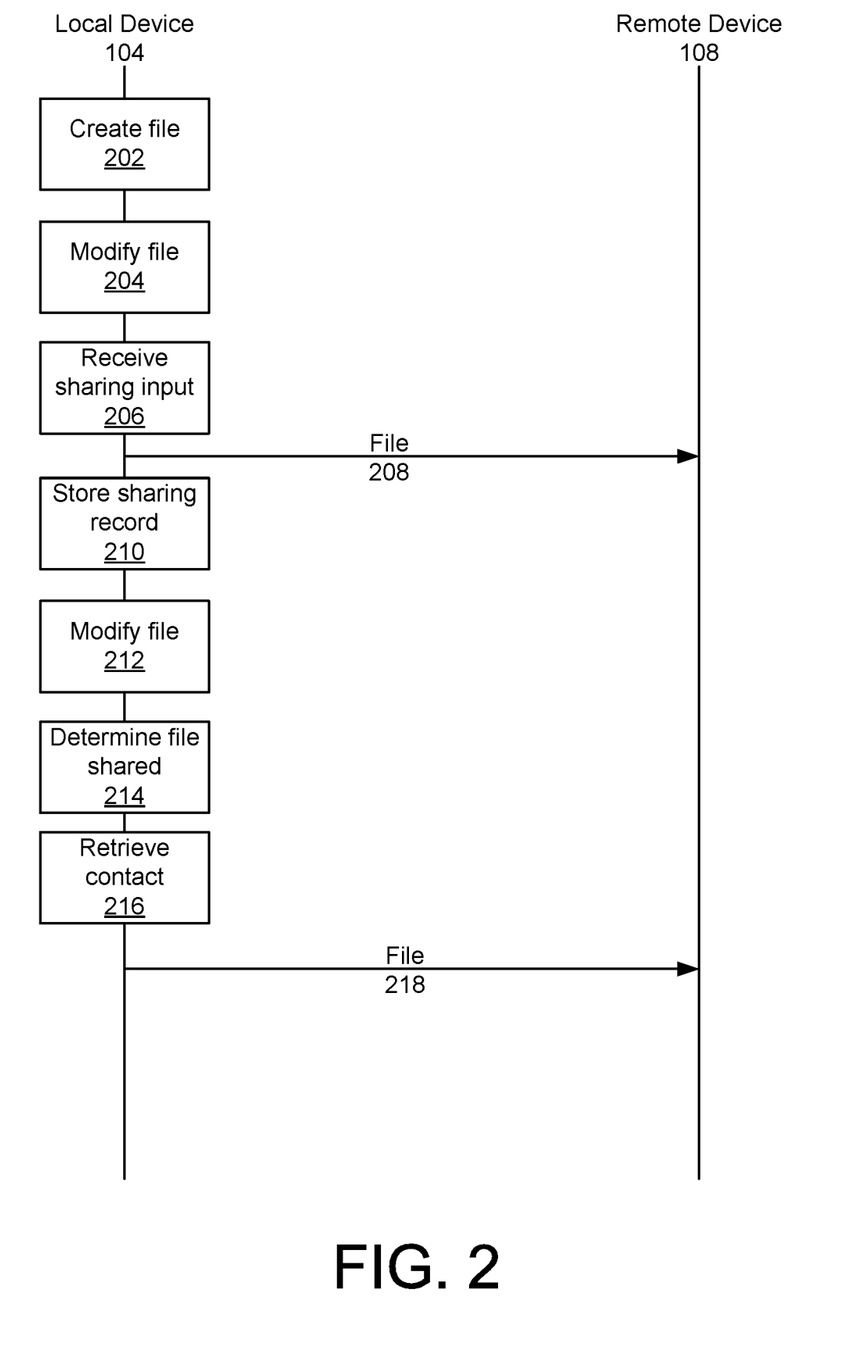
FIG. 2 is a timing diagram showing a local computing device modify and share a file according to an example.

FIG. 2 is a timing diagram showing the local computing device 104 modify and share a file according to an example. The local computing device 104 can create a file (202). The local computing device 104 can create a file (202) by, for example, opening an application such as a word processing application or spreadsheet application, processing input received from the local user 102, and saving the file in a database included in the local computing system 104.

The local computing device 104 can modify the file (204). The local computing device 104 can modify the file (204) by processing input into the file, such as text additions and/or text deletions, received from the local user 102.

Figure 3A:
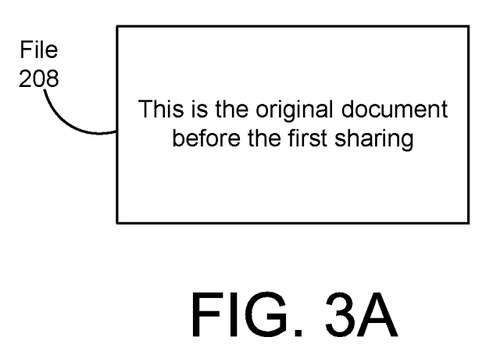
FIG. 3A shows a file according to an example.

FIG. 3A shows a file 208 according to an example. In this example, the file 208 is a word processing document. In this example, the file 208 includes text inputted by the local user 102.

Returning to FIG. 2, the local computing device 104 can receive sharing input (206). The local computing device 104 can receive sharing input (206) from the local user 102 by, for example, receiving input into a sharing button or receiving a sharing instruction from the local user 102 in association with the file and the remote user 110, or by receiving an instruction from the local user 102 to send an electronic message, such as an email, to an address associated with the remote user 110. The electronic message can include the file. In response to receiving the sharing input, the local computing device 104 can share the file 208 by sending the file 208 to the remote computing device 108 associated with the remote user 110.

The local computing device 104 can store a sharing record (210). The local computing device 104 can store the sharing record 210 in response to sharing and/or sending the file 208, and/or after sharing and/or sending the file 208. In some examples, the sharing record can identify the shared file 208 and the remote user 110 to whom the file 208 was sent and/or with whom the file 208 was shared. In some examples, the sharing record can identify the shared file 208, and the address, such as the email address, of the remote user 110 to whom the file 208 was sent and/or with whom the file 208 was shared.

The local computing device 104 can modify the file (212). The local computing device 104 can modify the file (212) after storing the sharing record (210). The local computing device 104 can modify the file (212) in response to input received from the local user 102, such as additions, removals, and/or replacements of data and/or text within the file.

Figure 3B:
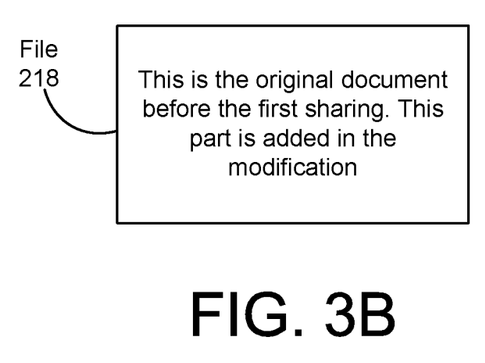
FIG. 3B shows a modified file according to an example.

FIG. 3B shows a modified file 218 according to an example. In this example, the file 208 has been modified by adding text, resulting in the modified file 218 shown in FIG. 3B.

Returning to FIG. 2, the local computing device 104 can determine whether the file 218 is a shared file (214). The local computing device 104 can determine whether the file 218 is a shared file (214) in response to and/or upon receiving sharing input from the local user 102, in response to and/or upon receiving input and/or an instruction from the local user 102 to save the modified file 218, and/or in response to and/or upon receiving input and/or an instruction from the local user 102 to close the application within which the file was modified.

In some examples, the local computing device 104 can determine whether the modified file 218 is a shared file by searching sharing records for an identifier and/or indicator of the file 218. If the local computing device 104 finds a sharing record with an identifier and/or indicator of the file 218, then the local computing device 104 can determine that the file 218 is a shared file based on the sharing record identifying and/or indicating the file 218.

The local computing device 104 can retrieve the contact (216). The local computing device 104 can retrieve the contact (216) after determining that the file 218 is a shared file. The local computing device 104 can retrieve the contact (216) with whom the modified file 218 should be shared. The local computing device 104 can retrieve the contact (216) by, for example, extracting an address from the sharing record that identifies and/or indicates the file 218.

The local computing device 104 can share and/or send the file 218 to the remote computing device 108. The remote computing device 108 can be associated with the remote user 110 identified by the retrieved contact. The local computing device 104 can share and/or send the file to the remote computing device 108 by sending an electronic message to the remote computing device 108. The remote computing device 108 can include the modified file 218.

In some examples, the local device 104 can receive a file from the remote device 108. In response to receiving the file from the remote device 108, the local device 104 can determine whether the received file was previously shared by the local device 104 with the remote device 108. The local device 104 can, for example, compare the received file to files for which storing records are shared. If the received file meets a threshold for having similar and/or matching content with a file for which a storing record is shared, then the sharing record can be updated to identify the received file (which the user may have instructed the local device 104 to share). The sharing record can then identify the received file, and the local device 104 can prompt the user to share the received file in response to triggering events with respect to the received file. In some examples, if the local device 104 receives a file for which no sharing record (such as of an existing file) can be identified, the local device 104 can create a new sharing record that identifies the source that the file was shared from. The source from which the file was shared can be an identifier of the user and/or computing device from which the file was received. If the received file is subsequently modified at the local computing device 104, then the local computing device 104 can, based on the sharing record identifying the file as a shared file, prompt the local user to send the updated and/or modified file back to the source that the file was received from (such as the remote computing device 108 and/or remote user 110), in a similar manner to a file that was created on the local computing device 104 and originally shared by the local computing device.

Figure 4A:
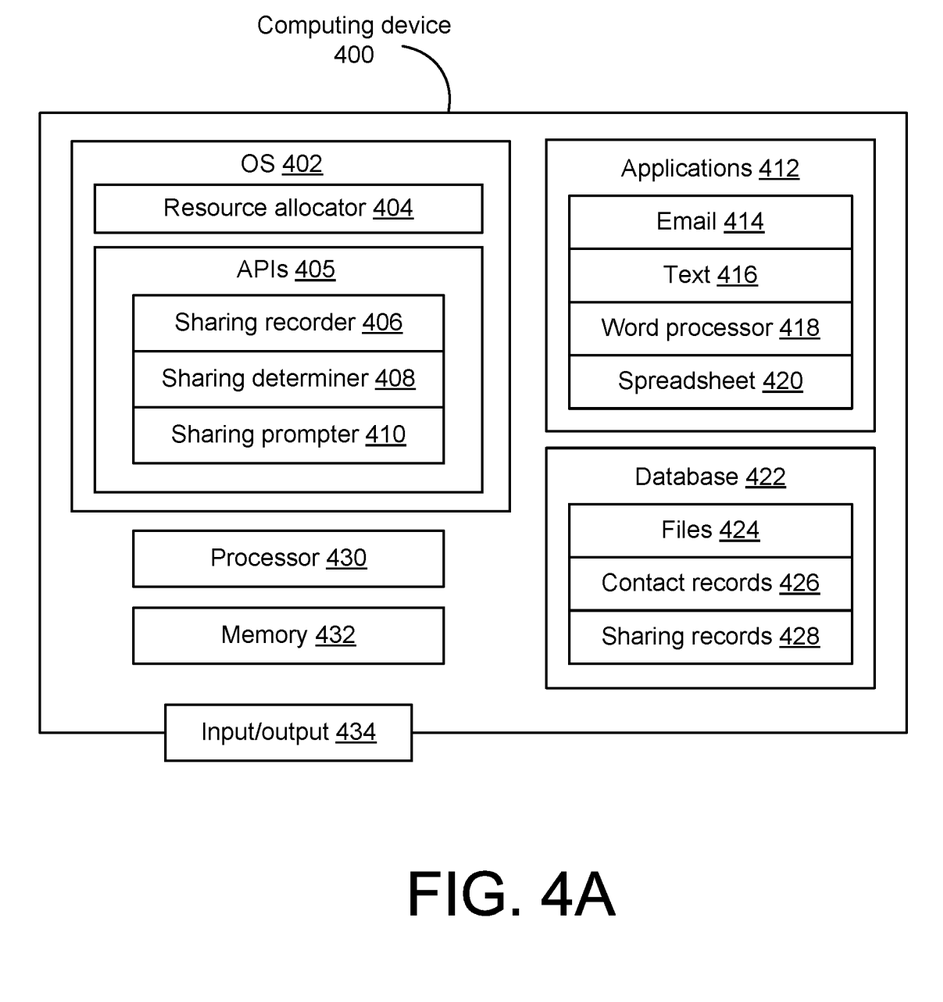
FIG. 4A shows a computing device according to an example.

FIG. 4A shows a computing device 400 according to an example. The computing device 400 can implement features of any of the local computing devices 104A, 104B, 104C, and/or any of the remote computing devices 108A, 108B, 108C, and/or can be an example of any of the computing devices 104A, 104B, 104C, 108A, 108B, 108C described above.

The computing device 400 can include an operating system 402. The operating system 402 can control and/or manage the components and/or modules included in the computing device 400. In some examples, the operating system 402 can implement and/or perform any combination of the methods, techniques, and/or functions described herein.

The operating system 402 can include a resource allocator 404. The resource allocator 404 can allocate computing resources, such as processor resources, memory resources, and/or communication resources, between various applications, processes, and/or threads running on the computing device 400.

The operating system 402 can include multiple application program interfaces (APIs) 405. The APIs 405 can include methods, functions, and/or techniques implemented and/or performed by the operating system 402 in response to triggering events. In some examples, the triggering events can include creation and/or storing of files, modification of files, saving files, closing applications that are executing files, or API calls by applications, as non-limiting examples. In some examples, the APIs 405 can be called and/or triggered by the applications in response to creation and/or storing of files, modification of files, saving files, and/or closing applications that are executing files. The APIs need not be separately written and/or stored for each application, but can be called by different applications, such as different word processing applications, and/or by the operating system 402, in response to triggering events.

The operating system 402 can include a sharing recorder API 406. The sharing recorder API 406 can create, record, and/or store sharing records. The sharing recorder API 406 can create, record, and/or store sharing records. The sharing recorder API 406 can create, record, and/or store sharing records in response to the local user 102 and/or local computing device 104 sharing and/or sending a file. The sharing record can include, for example, an identifier and/or indicator of the shared and/or sent file, and an identifier and/or indicator of the user to whom and/or with whom the file was sent and/or shared.

The operating system 402 can include a sharing determiner API 408. The sharing determiner API 408 can determine whether a file has been shared. The sharing determiner API 408 can determine whether a file has been shared in response to a file being modified, a file being saved, and/or an application executing the file being closed. The sharing determiner API 408 can determine whether a file has been shared by searching sharing records for a sharing record that identifies and/or indicates the file. The sharing determiner API 408 can determine that the file has been shared based on a sharing record identifying and/or indicating the file, such as by storing the name (such as a filename) and/or pathfile of the file.

The operating system 402 can include a sharing prompter API 410. The sharing prompter API 410 can prompt the local user 102 to share and/or send a file, and/or can prompt the computing device 400 to share and/or send the file. The sharing prompter API 410 can perform the prompt in response to the sharing determiner API 408 determining that the file is a shared file. The sharing prompter API 410 can present a prompt for the local user 102 to share and/or send the file, such as by indicating acceptance of sharing and/or sending the file. The prompt can include a pop-up window, with buttons for accept or reject, in the user interface of the application in which the file was opened, can include a text prompt requesting the local user 102 to type an acceptance or rejection of the prompt to share the file, or can open another application, such as an email or other messaging application, with the file attached and an address of the remote user 110, as non-limiting examples.

If the local user 102 accepts, and/or if the sharing prompter API 410 prompts the computing device 400 to share and/or send the file, then the sharing prompter API 410 can send the file to, and/or share the file with, the remote user 110, such as by sending the file to the remote user 110 as an attachment to an email. If the local user 102 rejects the prompt, then the sharing prompter API 410 will perform no further action. In some examples, the local user 102 can instruct the computing device 400 to share and/or send the file to the remote user 110, without the computing device 400 first prompting the local user 102, sharing and/or sending the file in response to a triggering event such as modification of files, saving files, closing applications that are executing files, or API calls by applications. In some examples, the file can be sent or shared by a different application, such as an email application, than the prompt was performed in, such as a word processing application.

In some examples, the sharing prompter API 410 can determine whether to prompt the local user 102 to share and/or send a file, and/or prompt the computing device 400 to share and/or send the file, by learning the likelihood of the local user 102 wanting to share the file, and/or based on the likelihood that the local user 102 will want to share the file. The sharing prompter API 410 can learn the likelihood of the local user 102 wanting to share the file by machine learning techniques. In some examples, the sharing prompter API 410 can determine to prompt the local user 102 to share the file based on previous responses to prompts in similar contexts. In some examples, if the local user 102 accepts the prompt to share a file in response to a particular trigger (such as the local user 102 saving the file, modifying the file, or closing the application in which the file was opened) equal to or greater than a threshold fraction of time, then the sharing prompter API 410 can continue to prompt the local user 102 to share the file in response to the particular trigger. In some examples, if the local user 102 rejects the prompt to share the file in response to the particular trigger equal to or greater than a threshold faction of time, then the sharing prompter API 420 can cease and/or discontinue prompting the local user 102 to share the file in response to the particular trigger. In some examples, if the local user 102 rejects the prompt to share the file in response to the particular trigger equal to or greater than a threshold faction of time, then the sharing prompter API 420 can cease and/or discontinue prompting the local user 102 to share the file in response to the particular trigger for multiple incidents of the particular trigger, but later prompt the local user 102 to share the file and, if the local user 102 accepts the prompt to share the file, resume prompting the local user 102 to share the file in response to the particular trigger.

The computing device 400 can include applications 412. The applications 412 can include programs executed and/or implemented by the computing device 400.

The applications 412 can include an email application 414. The email application 414 can send and receive electronic messages to and from other users and/or other computing devices. The electronic messages can include attachments, such as the shared file(s) described herein. The sharing prompter 410 can call the email application 414 to share the file by sending the file to the email address of the remote user 110 as an attachment in an email.

The applications 412 can include a text application 416. The text application 416 can send text messages to and from other computing devices, such as by using a telephone number as an address. The text application 416 can include files, such as pictures or videos, in the text messages. In some examples, the sharing prompter 410 can call the text application 416 to share the file by sending the file to the telephone number of the remote user 110 as an attachment in a text message.

The applications 412 can include a word processor application 418. The word processor application 418 can receive and store text data inputted by the local user 102, and can modify the text data based on input from the local user 102.

The applications 412 can include a spreadsheet application 420. The spreadsheet application 420 can receive numerical data and/or comma separated value input. The spreadsheet application 420 can perform calculations on the received data and/or input. The spreadsheet application 420 can modify the data and/or input based on input received from the local user 102.

The computing device 400 can include a database 422. The database 422 can store data received from the local user, and/or data generated by the computing device 400.

The database 422 can store files 424. The stored files 424 can include text data received by the word processor application 418 and numerical data and/or comma separated value input received by the spreadsheet application 420, as non-limiting examples. The files 424 are stored only locally on the computing device 400, and are not accessible to users of other computing devices, such as the remote user 110 of the remote computing device 108, until the computing device 400 shares and/or sends the file(s) 424 to the remote computing device 108.

The database can store contact records 426. The contact records 426 can include contact information for other users that is received from the local user 102, and/or that is received from other computing devices.

Figure 4B:
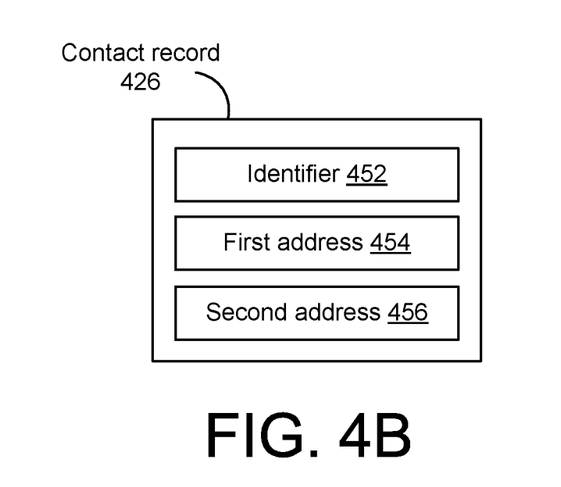
FIG. 4B shows a contact record according to an example.

FIG. 4B shows a contact record 426 according to an example. In this example, the contact record 426 includes an identifier 452, a first address 454, and a second address 456. The identifier 452 can include a name of the person whose contact is stored, and/or a unique identifier of a person or remote user 110. The first address 454 can include an address of the person identified by the contact record 426, such as an email address, telephone number, user identifier associated with a social networking website, or other address by which messages can be routed to the person. The second address 456 can include another address, different from the first address, such as an email address, telephone number, user identifier associated with a social networking website, or other address by which messages can be routed to the person. The second address 456 can be the same type of address as the first address 454, such as both being an email address or telephone number, or a different type of address than the first address 454.

The database 422 can store sharing records 428. The sharing records 428 can identify and/or indicate files that have been shared and identifiers of other users with whom the files have been shared.

Figure 4C:
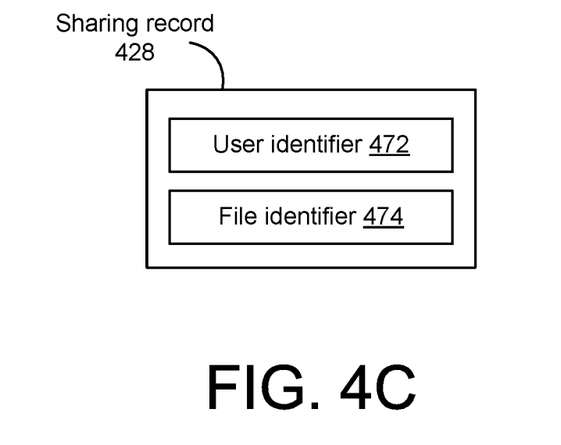
FIG. 4C shows a sharing record according to an example.

FIG. 4C shows a sharing record 428 according to an example. In this example, the sharing record 428 can include a user identifier 472 and a file identifier 474. The user identifier 472 can identify the user with whom the file was shared. In some examples, the user identifier 472 can match the user identifier 452 included in the contact record 426 for a user and/or person. The file identifier 474 can identify the file that was shared, such as by the filename and/or pathfile of the shared file.

The computing device 400 may include at least one memory device 432. The at least one memory device 432 can include a non-transitory computer-readable storage medium. The at least one memory device 432 can store data, such as data stored in the database 422 and/or any other information described herein with respect to the computing device 400. The at least one memory device 432 can also store instructions that, when executed by at least one processor, are configured to cause the computing device 400 to perform any combination of methods, functions, and/or techniques described herein with respect to the computing devices 104, 108, 400.

The computing device 400 may include at least one processor 430. The at least one processor 430 can execute instructions, such as instructions stored in the at least one memory device 432, to cause the computing device 400 to perform any combination of methods, functions, and/or techniques described herein with respect to the computing devices 104, 108, 400.

The computing device 400 may include at least one input/output node 434. The at least one input/output node 434 may receive and/or send data, such as from and/or to, the computing device 400. The input and output functions may be combined into a single node, or may be divided into separate input and output nodes. The input/output node 434 may utilize any wired or wireless communication technology.

Figure 5:
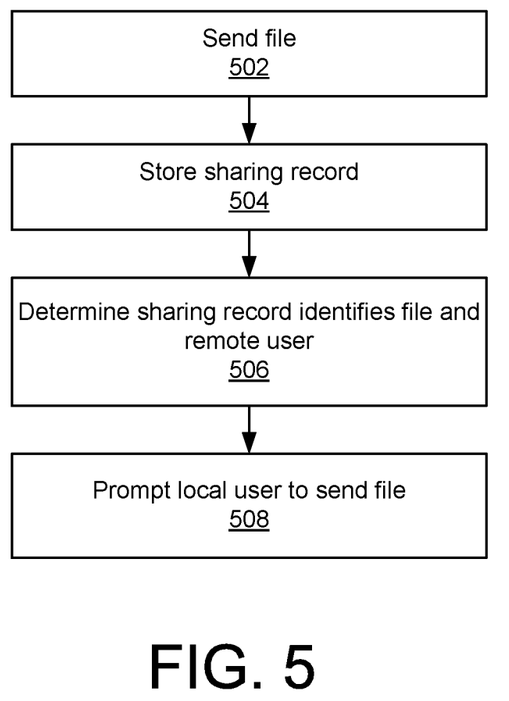
FIG. 5 shows a method of sharing a file according to an example.

FIG. 5 shows a method of sharing a file according to an example. The method can include, in response to receiving sharing input from a local user into a local computing device, sending a file from the local computing device to a recipient (502). The method can further include, in response to sending the file, storing a sharing record on the local computing device, the sharing record identifying the file and the recipient (504). The method can further include, in response to receiving modification input from the local user into the local computing device to modify the file, determining that the sharing record identifies the file and the recipient (506). The method can further include, based on determining that the sharing record identifies the file and the recipient, initiating sending at least a portion of the file to the recipient (508).

According to an example, the recipient can include at least one of a remote user, a user profile, or a remote user device.

According to an example, the initiating sending can include at least one of sending the at least the portion of the file to the recipient and prompting the local user to send the at least the portion of the file to the recipient.

According to an example, the sharing input can be received within a first application and the modification input is received within a second application, the second application being different than the first application.

According to an example, the sending the file in response to the sharing input can be performed by a different application than the initiating sending at leas the portion of the file to the recipient.

According to an example, the file can be stored on the local computing device and is inaccessible to the recipient.

According to an example, at least a portion of the file can include a modified portion of the file.

According to an example, the initiating sending at least a portion of the file to the recipient can include retrieving a contact record associated with the recipient, extracting an address from the contact record, and prompting the local user to send at least a portion of the file to the extracted address.

According to an example, the extracted address can be different than an address to which the local computing device sent the file in response to receiving sharing input from a local user into a local computing device.

According to an example, the initiating sending can be performed after closing an application via which the modification input was received.

Figure 6:
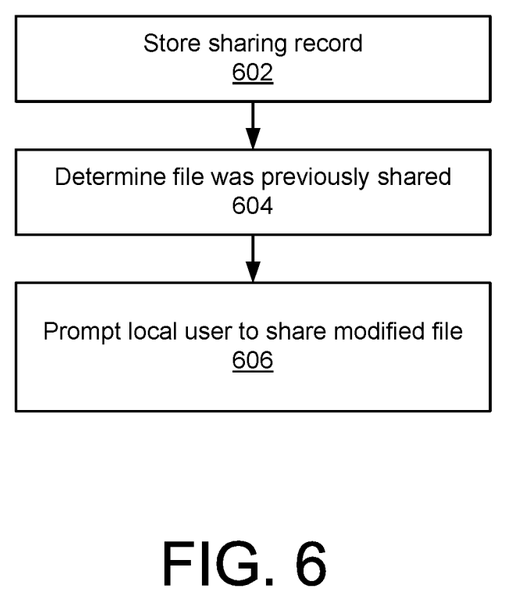
FIG. 6 shows a method of sharing a file according to an example.

FIG. 6 shows a method of sharing a file according to an example. The method can include storing, on a local computing device, a sharing record (602). The sharing record can indicate that a file was shared by a local user with a remote user. The file can be stored on the local computing device and be inaccessible to the remote user. The method can include, in response to the local user modifying the file, determining that the sharing record indicates that the file was previously shared by the local user with the remote user (604). The file can include, based on determining that the sharing record indicates that the file was shared by the local user with the remote user, prompting the local user to subsequently share the modified file with the remote user (606).

According to an example, the previously sharing can include sending an electronic message from the local computing device to an address associated with the remote user, the electronic message including the file.

According to an example, the previously sharing can include sending a first electronic message from the local computing device to a first address associated with the remote user, the first electronic message including the file, and the subsequently sharing can include sending a second electronic message from the local computing device to a second address associated with the remote user. The second electronic message can include the modified file. The second address can be different than the first address.

Figure 7:
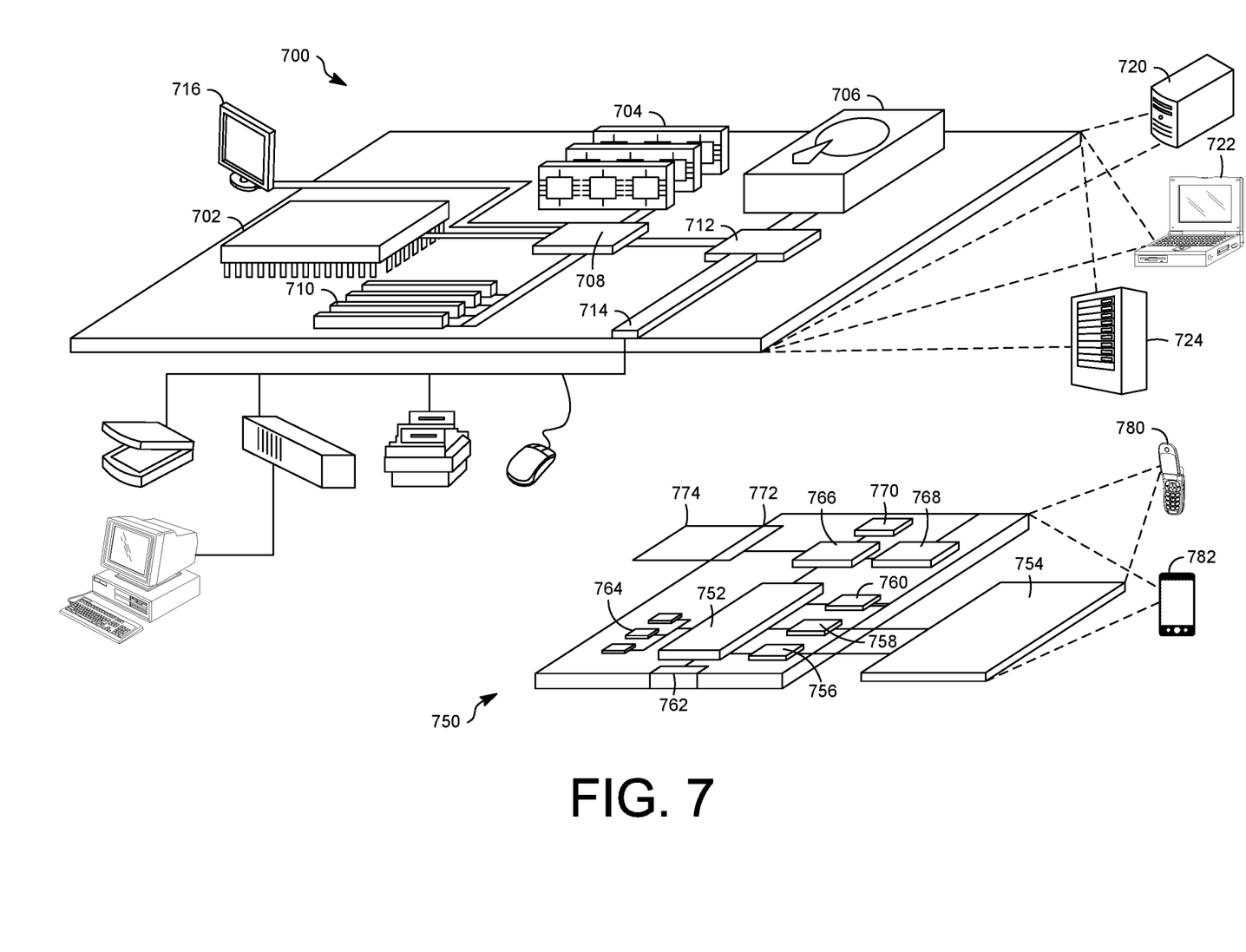
FIG. 7 shows an example of a computer device and a mobile computer device that can be used to implement the techniques described here.

FIG. 7 shows an example of a generic computer device 700 and a generic mobile computer device 750, which can be examples of the computing devices 104, 108, 400 described above, and may be used with the techniques described here. Computing device 700 is intended to represent various forms of digital computers, such as laptops, desktops, tablets, workstations, personal digital assistants, televisions, servers, blade servers, mainframes, and other appropriate computing devices. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. The processor 702 can be a semiconductor-based processor. The memory 704 can be a semiconductor-based memory. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   in response to receiving a sharing input from a local user at a local client device, sending a file from the local client device to a recipient client device;
   in response to sending the file, and after sending the file, storing a sharing record on the local client device, the sharing record identifying the file and the recipient client device;
   in response to receiving modification input, from the local user at the local client device, that modifies the file, determining that the sharing record identifies the file and the recipient client device and indicates that the file has been shared; and
   based on determining that the sharing record identifies the file and the recipient client device and indicates that the file has been shared, initiating sending of at least a portion of the file to the recipient client device, the sharing record indicating that the file was previously shared by the local user with the recipient client device.

2. The method of claim 1, wherein initiating the sending of at least the portion of the file includes prompting the local user to send at least the portion of the file to the recipient client device.

3. The method of claim 1, wherein an application sending the file in response to the sharing input is different than an application initiating the sending of at least the portion of the file to the recipient client device.

4. The method of claim 1, wherein the file is stored on the local client device and is inaccessible to the recipient client device.

5. The method of claim 1, wherein at least the portion of the file includes a modified portion of the file.

6. The method of claim 1, wherein initiating the sending of at least the portion of the file to the recipient client device includes:
   retrieving a contact record associated with the recipient client device;
   extracting a contact address from the contact record; and
   prompting the local user to send at least the portion of the file to the contact address.

7. The method of claim 6, wherein the contact address is different than an address to which the local client device sent the file in response to receiving the sharing input from the local user into the local client device.

8. The method of claim 1, wherein initiating the sending of at least the portion of the file is performed after closing an application via which the modification input was received.

9. The method of claim 1, wherein the file is not stored on any computing device other than the local client device and the recipient client device.

10. The method of claim 1, wherein the sharing input includes selection of a sharing button built into a word processor application or a spreadsheet application.

11. The method of claim 1, wherein the sharing input includes an instruction for an email program to send the file to the recipient client device, the file being attached to an email with an email address associated with a remote user of the recipient client device.

12. A non-transitory computer-readable storage medium comprising instructions stored thereon that, when executed by at least one processor, are configured to cause a local client device to:
   in response to receiving a sharing input from a local user at the local client device, send a file from the local client device to a recipient client device;
   in response to sending the file, and after sending the file, store a sharing record on the local client device, the sharing record identifying the file and the recipient client device;
   in response to receiving modification input, from the local user at the local client device, that modifies the file, determine that the sharing record identifies the file and the recipient client device and indicates that the file has been shared; and
   based on determining that the sharing record identifies the file and the recipient client device and indicates that the file has been shared, initiate sending of at least a portion of the file to the recipient client device, the sharing record indicating that the file was previously shared by the local user with the recipient client device.

13. The non-transitory computer-readable storage medium of claim 12, wherein the file is stored on the local client device and is inaccessible to the recipient client device.

14. The non-transitory computer-readable storage medium of claim 12, wherein at least the portion of the file includes a modified portion of the file.

15. The non-transitory computer-readable storage medium of claim 12, wherein the initiating the sending of at least the portion of the file to the recipient client device includes:
   retrieving a contact record associated with the recipient client device;
   extracting a contact address from the contact record; and
   prompting the local user to send at least the portion of the file to the contact address.

16. The non-transitory computer-readable storage medium of claim 15, wherein the contact address is different than an address to which the local client device sent the file in response to receiving the sharing input.

17. The non-transitory computer-readable storage medium of claim 12, wherein initiating the sending is performed after closing an application via which the modification input was received.

18. An apparatus comprising:
at least one processor; and
at least one memory device, the at least one memory device comprising instructions stored thereon that, when accessed by the at least one processor, cause the apparatus to:
  in response to receiving a sharing input from a local user at a local client device, send a file from the local client device to a recipient client device, the sharing input including at least one of:
    selection of a sharing button built into a word processor application or a spreadsheet application; or
    an instruction for an email program to send the file to the recipient client device, the file being attached to an email with an email address associated with a remote user of the recipient client device;
  in response to sending the file, and after sending the file, store a sharing record on the local client device, the sharing record identifying the file and the recipient client device;
  in response to receiving modification input, from the local user at the local client device, that modifies the file, determine that the sharing record identifies the file and the recipient client device and indicates that the file has been shared; and
  based on determining that the sharing record identifies the file and the recipient client device and indicates that the file has been shared, initiate sending of at least a portion of the file to the recipient client device, the sharing record indicating that the file was previously shared by the local user with the recipient client device.

19. The apparatus of claim 18, wherein an application sending the file in response to the sharing input is different from an application initiating the sending of at least the portion of the file to the recipient client device.

20. The apparatus of claim 18, wherein at least the portion of the file includes a modified portion of the file.

* * * * *